Figure 1:
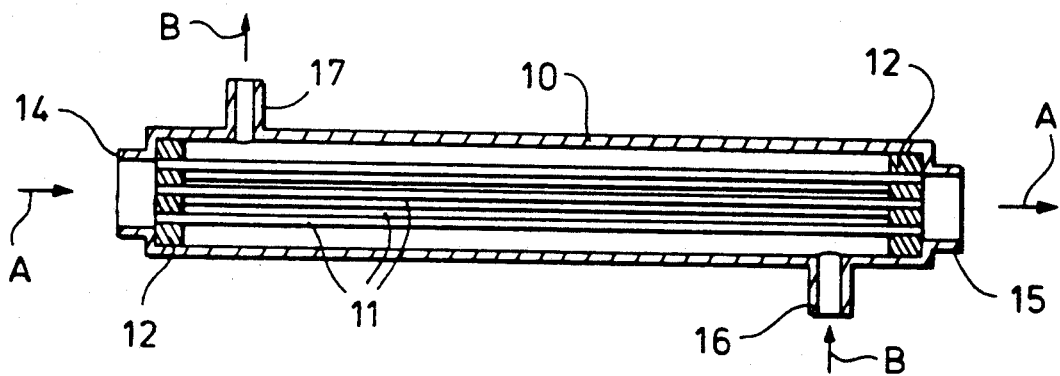

United States Patent [19]
Lovelock

[11] Patent Number: 5,160,511
[45] Date of Patent: Nov. 3, 1992

[54] WATER-VAPOUR PERMEABLE MATERIAL

[75] Inventor: James E. Lovelock, Launceston, Great Britain

[73] Assignee: Hewlett-Packard Company, Palo Alto, Calif.

[21] Appl. No.: 359,661

[22] PCT Filed: Sep. 7, 1988

[86] PCT No.: PCT/GB88/00736

§ 371 Date: Jun. 19, 1989

§ 102(e) Date: Jun. 19, 1989

[87] PCT Pub. No.: WO89/02447

PCT Pub. Date: Mar. 23, 1989

[30] Foreign Application Priority Data

Sep. 10, 1987 [GB] United Kingdom ............... 8721266
Nov. 4, 1987 [GB] United Kingdom ............... 8725879

[51] Int. Cl.$^5$ .................. B01D 53/22; B01D 63/02
[52] U.S. Cl. .......................... 55/16; 55/68; 55/158
[58] Field of Search .................. 55/16, 158, 68

[56] References Cited

U.S. PATENT DOCUMENTS

| | | |
|---|---|---|
| 3,566,580 | 3/1971 | Li ............................... 55/16 |
| 3,735,558 | 5/1973 | Skarstrom et al. ............... 55/16 |
| 3,735,559 | 5/1973 | Salemme ........................ 55/16 |
| 4,039,497 | 8/1977 | Troussier et al. ............ 428/422 X |
| 4,268,279 | 5/1981 | Shindo et al. ................. 55/16 |
| 4,414,693 | 11/1983 | Brody ......................... 55/16 X |
| 4,461,847 | 7/1984 | Hudecek et al. .............. 55/16 X |
| 4,515,761 | 5/1985 | Plotzker ..................... 55/16 X |
| 4,612,019 | 9/1986 | Langhorst ..................... 55/16 |
| 4,666,468 | 5/1987 | Wu ............................. 55/16 |
| 4,718,921 | 1/1988 | Makino et al. ................. 55/16 |

FOREIGN PATENT DOCUMENTS

| | | |
|---|---|---|
| 0122049 | 10/1984 | European Pat. Off. ............ 55/158 |
| 53-145343 | 12/1978 | Japan .......................... 55/16 |
| 54-006345 | 1/1979 | Japan .......................... 55/16 |
| 54-015349 | 2/1979 | Japan ......................... 55/158 |
| 54-114481 | 9/1979 | Japan ......................... 55/158 |
| 61-187918 | 8/1986 | Japan .......................... 55/16 |
| 61-229830 | 10/1986 | Japan .......................... 55/16 |
| 62-042723 | 2/1987 | Japan .......................... 55/16 |
| 62-192589 | 8/1987 | Japan .......................... 55/16 |
| 62-241527 | 10/1987 | Japan .......................... 55/16 |
| 63-116724 | 5/1988 | Japan ......................... 55/158 |
| 63-256119 | 10/1988 | Japan .......................... 55/16 |
| 1406673 | 9/1975 | United Kingdom . |
| 2139110 | 11/1984 | United Kingdom ............... 55/16 |

OTHER PUBLICATIONS

C. Fabiani et al., "Correlations Between Electroosmotic Coefficients and Hydraulic Permeability in Nafion Membranes", J. of Membr. Sci, 16, (1983), 51–61.

R. S. Yeo et al., "Perfluorosulphonic Acid (Nation) Membranes as a Separator for an Advanced Alkaline Water Electrolyser", J. of Appl. Mic. Chem. 10 (1980) 741–747.

Primary Examiner—Robert Spitzer

[57] ABSTRACT

An apparatus and method for drying a wet gas. The apparatus has a chamber with an inlet port (14) for entry of the wet gas, and an outlet port (15) for exit of the dried sample of the wet gas. The chamber has a water-vapour permeable membrane (11) for separating at least a portion of wet gas from a drying agent adapted to operate at temperatures up to 100° C. and comprises a perflurocarbon polymer with lithium sulphate groups covalently bonded to at least a portion of the carbon skeleton.

19 Claims, 1 Drawing Sheet

WATER-VAPOUR PERMEABLE MATERIAL

The present invention relates to materials permeable to water vapour. As is well known, the polymers of perfluoroethylene sulphonic acid that are available under the trade name Nafion of E. I. DuPont de Nemours, have the useful property of being freely permeable to the passage of water vapour but almost impermeable to nearly all other gases and vapours. Tubing and membranes made of this material are therefore used to add or remove water vapour from gas mixtures or from flowing stream of gas mixtures.

One disadvantage of such a perfluoroethylene sulphonic acid polymer is that it is a very strong acid and somewhat unstable to heat. It can not, for example, be used at the temperature of boiling water 100° C. This temperature limitation limits the use of this material for separating gases and vapours from steam.

It is an object of the invention to provide a material that is more stable than the foregoing polymer but still water-vapour permeable.

According to the present invention, there is provided a water-vapour permeable material comprising a perfluorocarbon polymer incorporating lithium sulphate groups covalently bonded to the carbon skeleton of the polymer.

The lithium polymer is not only more stable to heat but also neutral and less likely to react with labile compounds or to catalyse their decomposition.

Although it has previously been proposed to neutralise perfluoroethylene sulphonic acid polymers by replacing the hydrogen ion of the sulphonic acid by sodium or potassium, the resulting material, while being more heat stable, has been very much less permeable to water vapour.

In a preferred embodiment of the invention the polymer concerned is a polymer of perfluoroethylene of the following form:

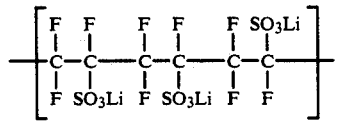

However, other perfluorocarbon polymers may be used, for example:

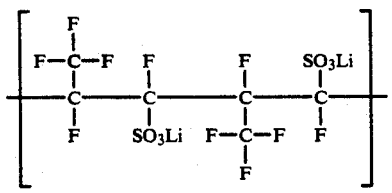

The method of neutralisation is to steep a perfluorocarbon sulphonic acid polymer material in lithium hydroxide solution for a few hours, followed by washing with water and drying.

It is therefore a straightforward matter to produce products made of the lithium-neutralised polymer, since products made of the un-neutralised polymer material (for example, tubes, membranes) can simply be taken and immersed in lithium hydroxide solution to produce improved-stability products.

Gas-drying apparatus embodying the invention will now be described, by way of example, with reference to the accompanying diagrammatic drawing which is a longitudinal cross-section through the apparatus.

Small diameter, thin-walled tubing obtained from E. I. DuPont de Nemours under their trade name "Nafion" was immersed in lithium hydroxide for several hours before being washed and dried. The sulphonic acid groups of the original tubing were converted to lithium sulphate groups.

The tubing was divided into lengths 11 which were used to construct the illustrated gas-drying apparatus. This apparatus comprises a cylinder 10 surrounding a bundle of the tubing lengths 11. The tubing lengths pass through end seals 12 in the cylinder 10 and terminate in connections 14, 15 that permit a stream of wet gas to be passed through the tubing lengths 11. The body of the cylinder is provided with input and output connectors 16, 17 to enable a drying agent to be passed over the outside of the tubing lengths 11.

In use, a wet gas such as nitrogen and steam is passed through the tubing lengths 11 via the connectors 14, 15 in the direction of the arrows A. A dry gas (dry air) is passed over the outside of the tubing lengths 11 via the connectors 16, 17 in the direction of arrows B. The water vapour in the wet gas stream passes through the walls of the tubing lengths 11 into the dry gas; as a result, the wet gas is substantially dried by the time it exits the apparatus.

Apparatus of the illustrated form has been found to work well and survive at 100° C. and to dry steam-saturated nitrogen or other gases at this temperature.

I claim:

1. In a method of removing water vapour from a wet gas comprising:
   (1) passing the wet gas along one surface of a water-vapour permeable membrane, and
   (2) passing a drying agent along the opposite surface of said water-permeable membrane, the improvement wherein said water-vapour permeable membrane is adapted to operate at temperatures of up to about 100° C., which membrane comprises a perfluorocarbon polymer having lithium sulphate groups covalently bonded to at least a portion of the carbon skeleton.

2. The method of claim 1 wherein said perfluorocarbon polymer comprises perfluoroethylene polymer.

3. The method of claim 1 wherein said perfluorocarbon polymer comprises perfluoroethylene polymer at least partially neutralized with lithium ions.

4. The method of claim 1 wherein said separating step comprises providing at least a portion of said membrane in the form of a tubular member, and containing the wet gas or said drying agent in said tubular member.

5. The method of claim 4 wherein said containing step comprises passing said wet gas through said tubular member, and further comprising exposing the outer surface of said tubular member to said drying agent.

6. The method of claim 5 wherein said exposing step comprises passing said drying agent over said tubular member.

7. The method of claim 1 wherein said drying agent comprises a dry gas.

8. In an apparatus for drying a wet gas comprising a chamber (10) having a first inlet port (14) to allow entry of a wet gas into said chamber, a first outlet port (15) to allow the exit of the dried sample of the wet gas from the chamber, and a water-vapour permeable membrane (11) retained within said chamber to allow separation of said dried sample of the wet gas from the water-vapour portion of the wet gas, the improvement wherein said membrane is adapted to operate at temperatures up to about 100° C. and comprises a perfluorocarbon polymer having lithium sulphate groups covalently bonded to at least a portion of the carbon skeleton.

9. Apparatus according to claim 8 wherein the perfluorocarbon polymer comprises a perfluoroethylene sulphonic acid polymer neutralized with lithium ions.

10. An apparatus according to either claim 8 or claim 9 wherein the membrane comprises a tube (11) extending from the first inlet port to the first outlet port.

11. An apparatus according to claim 10 wherein said tube comprises a plurality of tubes (11) extending from the first inlet port (14) to the first outlet port (15).

12. An apparatus according to claim 11 wherein the chamber (10) has a second inlet port (16) to allow the entry of a drying agent into the chamber to dry the wet gas, and a second outlet port (17) to allow the exit of spent drying agent.

13. An apparatus according to claim 12 wherein the drying agent is gaseous.

14. A gas drying apparatus adapted to operate at temperature as high as 100° C. to transfer at least a portion of the water vapour from the wet gas to a drying agent, said apparatus comprising means for separating the wet gas from the drying agent, said separating means comprising a water-vapour permeable membrane adapted to operate at temperatures of up to about 100° C. and comprising a perfluorocarbon polymer having lithium sulphate groups covalently bonded to at least a portion of the carbon skeleton.

15. The apparatus of claim 14 wherein said perfluorocarbon polymer comprises perfluoroethylene polymer.

16. The apparatus of claim 15 wherein said perfluoroethylene polymer comprises perfluoroethylene polymer having at least a portion thereof neutralized with lithium ions.

17. The apparatus of claim 14 wherein said membrane comprises means for containing said wet gas.

18. The apparatus of claim 14 wherein said membrane comprises means for containing said drying agent.

19. The apparatus of claim 17 or 18 wherein said containing means comprises said membrane in the form of a tubular member, the walls of said tubular member separating said wet gas from said drying agent.

* * * * *